(12) United States Patent  (10) Patent No.: US 9,345,113 B2
Wernars et al.  (45) Date of Patent: May 17, 2016

(54) METHOD AND DEVICE FOR PROGRAMMING A MICROCONTROLLER

(75) Inventors: Johannes Petrus Wernars, Eindhoven (NL); Victor Mayr, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1063 days.

(21) Appl. No.: 13/379,682

(22) PCT Filed: Jun. 21, 2010

(86) PCT No.: PCT/IB2010/052788
§ 371 (c)(1),
(2), (4) Date: Dec. 21, 2011

(87) PCT Pub. No.: WO2010/150169
PCT Pub. Date: Dec. 29, 2010

(65) Prior Publication Data
US 2012/0091909 A1  Apr. 19, 2012

(30) Foreign Application Priority Data
Jun. 24, 2009 (EP) .................... 09163617

(51) Int. Cl.
*H05B 37/02* (2006.01)
*H05B 33/08* (2006.01)
*H04B 3/54* (2006.01)

(52) U.S. Cl.
CPC .............. *H05B 37/0263* (2013.01); *H04B 3/54* (2013.01); *H05B 33/0815* (2013.01); *H04B 2203/542* (2013.01); *H04B 2203/5412* (2013.01)

(58) Field of Classification Search
CPC ............................... H02J 13/0089; G06F 1/08
USPC ...... 315/209 R, 224, 247, 291, 307, 312–326
See application file for complete search history.

(56) References Cited

U.S. PATENT DOCUMENTS

| 4,423,506 | A | * | 12/1983 | Kawasaki et al. ............. 370/221 |
| 4,641,126 | A | | 2/1987 | Crowe |
| 2002/0051727 | A1 | | 5/2002 | Berglund |
| 2003/0030386 | A1 | | 2/2003 | Leeb |
| 2003/0057888 | A1 | | 3/2003 | Archenhold |
| 2003/0208989 | A1 | | 11/2003 | Thomas et al. |
| 2005/0231128 | A1 | | 10/2005 | Franklin |
| 2012/0051444 | A1 | * | 3/2012 | Steiner et al. ................. 375/257 |
| 2012/0091915 | A1 | * | 4/2012 | Ilyes et al. .................... 315/307 |

FOREIGN PATENT DOCUMENTS

WO  9821803 A2  5/1998
WO  2009040718 A2  4/2009

* cited by examiner

*Primary Examiner* — Tuyet Vo

(57) ABSTRACT

A programming device (100) for programming a controller (10) in an electronic driver (200) comprises a controllable voltage supply (30) for generating an AC supply voltage suitable for supplying the electronic driver (200) and a programming controller (20) for controlling the voltage supply (30). The programming device (100) is designed to modulate the supply frequency in order to both feed the electronic driver (200) and send programming data to the electronic driver (200).

5 Claims, 2 Drawing Sheets

METHOD AND DEVICE FOR PROGRAMMING A MICROCONTROLLER

FIELD OF THE INVENTION

The present invention relates in general to mains-powered apparatus having a control device included, such as a microcontroller or the like. In a specific embodiment, the present invention relates to a driver for driving a light source such as for instance a LED or a gas discharge lamp; hereinafter, the present invention will be specifically explained for the case of such driver, but it is noted that the gist of the invention can be applied in many other situations.

BACKGROUND OF THE INVENTION

FIG. 1 is a schematic block diagram illustrating an electronic driver 1 for driving a light source 2, the driver being powered from mains. Specifically, the driver 1 has input terminals 3, 4 for connection to mains, and output terminals 8, 9 for connecting a lamp 2. Several implementations for such electronic driver are possible, as will be known to persons skilled in the art. Since such drivers are commonly known, while the exact design of the driver is of no relevance to the implementation of the present invention, a detailed description of the driver design is omitted here. However, it is essential that the driver 1 comprises a control device 10 controlling the operation of the driver, and that such controller is capable of being programmed (i.e. a change of the software and/or parameters stored in memory is possible). The control device may for instance be implemented as CPU, microprocessor, micro-controller, etc., and will hereinafter simply be referred to as controller.

For a correct functioning of the driver 1, the controller 10 should be configured and tuned, which is normally done in a test facility of the manufacturer. The process of configuration and tuning may be done by human personnel, but may also be done by a tuning apparatus, which itself can be implemented as a software application running on a computer (PC, laptop). The process in any case requires communication of data towards the controller, and communication back from the controller.

As long as the controller 10 has not been built into the driver yet, it is relatively easy to communicate with the controller. However, as soon as the controller 10 is in a built-in condition, it is more difficult to communicate with the controller. For allowing access to the controller from outside, it may be necessary to physically contact the controller using special pins, and/or it may be necessary to provide the driver 1 with a separate connector. However, these solutions are relatively costly.

SUMMARY OF THE INVENTION

An objective of the present invention is to provide a solution to the above-mentioned problems.

Considering that the need for the communication channel towards the controller is basically only needed in the manufacturing stage of the driver, it is a specific objective of the present invention to provide a simple and cheap manner of communicating with the controller with as little changes to the driver as possible.

In one aspect, the present invention provides a controllable power supply, capable of providing AC voltage of which the frequency can be manipulated. It is noted that WO-98/21803 describes a system where the frequency of the mains supply is manipulated in order to control energy consuming systems nationwide. This system is clearly not suitable for configuring one individual electronic driver. The frequency changes available are only marginal, and the duration of signals is quite long, in the order of several seconds per bit.

In a second aspect, the present invention provides a test facility equipped with such controllable power supply; in such facility, it is possible to supply the driver with "manipulated" mains, i.e. an AC supply voltage of which the frequency is modulated. It should be clear to a person skilled in the art that modulation of frequency offers the possibility of data transfer.

In a third aspect, the present invention provides a driver capable of demodulating a frequency-modulated mains.

In a fourth aspect, the present invention provides a method for downloading information from a voltage supply to a device receiving its power from the voltage supply.

It is further preferred that the controller can communicate back to the programming device, without the need for specific communication lines. Therefore, in a fifth aspect, the present invention provides an electronic driver comprising a controller designed to modulate the current drawn from the voltage supply.

In a sixth aspect, the present invention provides a test facility comprising a current sensor for detecting the modulated current.

In a seventh aspect, the present invention provides a method for uploading information to a voltage supply from a device receiving its power from the voltage supply.

In an eighth aspect, the present invention provides a method for two-way communication over a supply line.

Further advantageous elaborations are mentioned in the dependent claims.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, and in which.

DETAILED DESCRIPTION OF THE INVENTION

Figure 2:
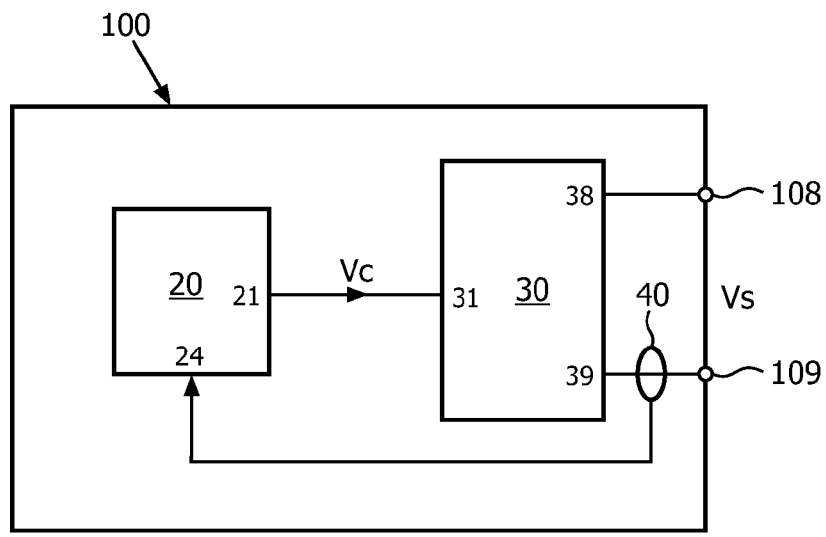
FIG. 2 schematically shows a programming device for an electronic driver.

FIG. 2 schematically shows a programming device 100 for an electronic driver, comprising a program control device 20 and a voltage supply 30 suitable for providing a supply voltage Vs for an electronic lamp driver as a replacement for ordinary mains. Thus, for instance, the voltage supply is capable of providing at its output terminals 38, 39, which are connected to output terminals 108, 109 of the programming device 100, an alternating voltage having an amplitude of about 330 V. In an input stage of a lamp driver (or other device receiving this voltage), the input voltage will first be rectified, for instance by a diode bridge, and it should be clear to a person skilled in the art that the proper functioning of the lamp driver (or other device) does hardly or not depend on the frequency of the AC input voltage. In a common supply, and particularly in normal mains, this supply frequency is substantially constant (i.e. 50 Hz in Europe). It is a particular aspect of the present invention that the supply voltage frequency is modulated in order to transfer data to the lamp driver (or other device). To this end, the voltage supply 30 has a control input 31, and the program control device 20 has a control output 21 coupled to this control input 31; the voltage supply 30 is designed to set its output frequency in accordance with a control signal received at its control input 31.

Frequency modulation can be executed in many ways, as should be known to a person skilled in the art, and in principle all modulation schemes can be applied when implementing the present invention. Nevertheless, the present invention also proposes a very simple modulation scheme, which will be explained with reference to FIG. 3. In this scheme, the voltage supply 30 can operate in three different operational states, these states being distinguished from each other by different output frequencies. A first state will be indicated as a normal state, in which no data are transferred: in this state the output voltage has a first frequency, for instance 50 Hz. A second state will be indicated as a first data state, in which one bit of data having a first value (for instance "1") is transferred: in this state the output voltage has a second frequency clearly distinguishable from the first frequency, for instance 125 Hz. A third state will be indicated as a second data state, in which one bit of data having a second value (for instance "0") is transferred: in this state the output voltage has a third frequency clearly distinguishable from the first and second frequencies, for instance 250 Hz.

For communication purposes, it would be possible to define consecutive time frames of mutually identical length, and to set the output frequency per time frame. However, this would require timing and synchronization. In a simple embodiment, the length of a data unit is defined as a time period starting with a zero-crossing and ending with a zero-crossing, with possibly a predetermined number of zero-crossings in between. Thus, a data unit may have a time duration corresponding to 360° of voltage signal, but in the currently preferred embodiment a data unit corresponds to 180° of voltage signal; this not only offers a larger data rate, but also offers the advantage of easier decoding.

Figure 3:
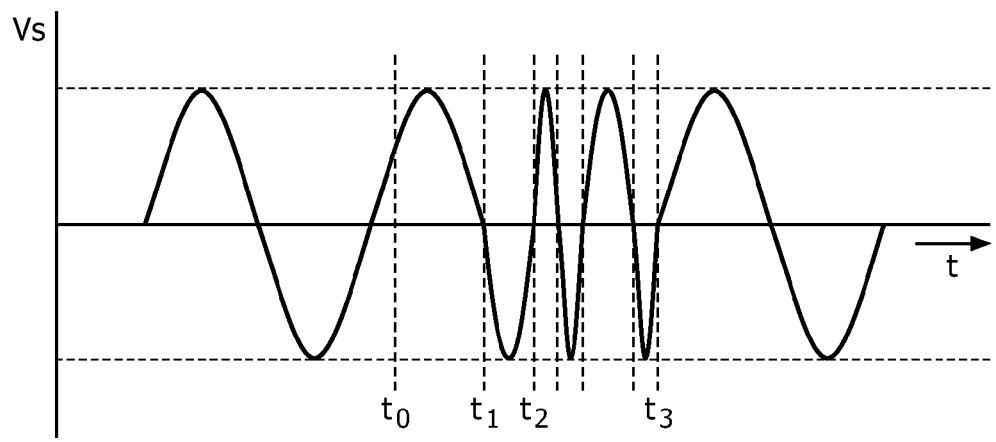
FIG. 3 is a graph showing the output voltage of the programming device as a function of time.

FIG. 3 is a graph showing the output voltage Vs as a function of time for an exemplary situation. Initially, the program control device 20 does not send any data; its control signal Vc for the voltage supply 30 has a first value, causing the voltage supply 30 to operate in its first state so that the output voltage Vs has the first frequency, for instance 50 Hz. Assume that on time t0 the program control device 20 wishes to send data. It generates its control signal Vc for the voltage supply 30 with a second value, indicating data bit "1", and in response the voltage supply 30, starting at the next zero-crossing at time t1, makes a transition to its second state in which it generates its output voltage Vs at the second frequency, for instance 125 Hz. The voltage supply 30 remains in this second state until the next zero-crossing at time t2, so that the output voltage Vs shows half a period or 180° of phase at the second frequency. This means in this example that the interval between two zero-crossings at times t1 and t2 is equal to 4 ms. After time t2, the voltage supply 30 is ready to obey the next command from the program control device 20.

Assume that the data to be sent contains a second bit "0", indicated by a third value of the control signal Vc. In response, the voltage supply 30, starting at the zero-crossing of time t2, makes a transition to its third state in which it generates its output voltage Vs at the third frequency, for instance 250 Hz. The voltage supply 30 remains in this second state until the next zero-crossing, so that the output voltage Vs shows half a period or 180° of phase at the third frequency. This means in this example that the interval between two zero-crossings is equal to 2 ms.

The above is continued for all data bits. The figure shows that the program control device 20 is ready at time t3, so that the voltage supply 30 continues to operate in its first state, with time intervals between zero-crossings being equal to 10 ms. It should be clear that the length of one data bit may also correspond to n*180°, n being any real number.

It should also be clear that the frequencies used do not necessarily have to be very accurate. For instance, in the above example, a frequency in a range of 100 Hz or lower, corresponding to time intervals of 5 ms or longer, may indicate "no data"; a frequency in a range between 100 Hz and 200 Hz, corresponding to time intervals between 5 ms and 2.5 ms, may indicate data "1"; and a frequency in a range between 200 Hz and higher, corresponding to time intervals of 2.5 ms or shorter, may indicate data "0".

It is further possible to use more than two different data frequencies in order to increase the data rate. For instance, using four possible data frequencies to choose from allows for sending two data bits simultaneously.

Figure 1:
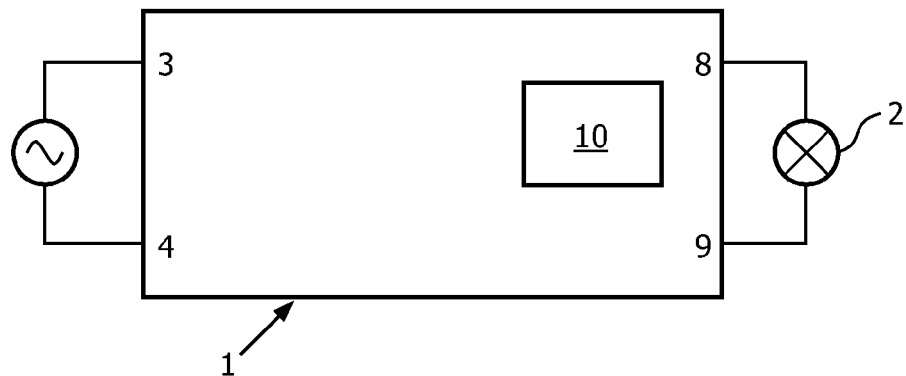
FIG. 1 is a schematic block diagram illustrating an electronic driver powered from mains.
Figure 4:
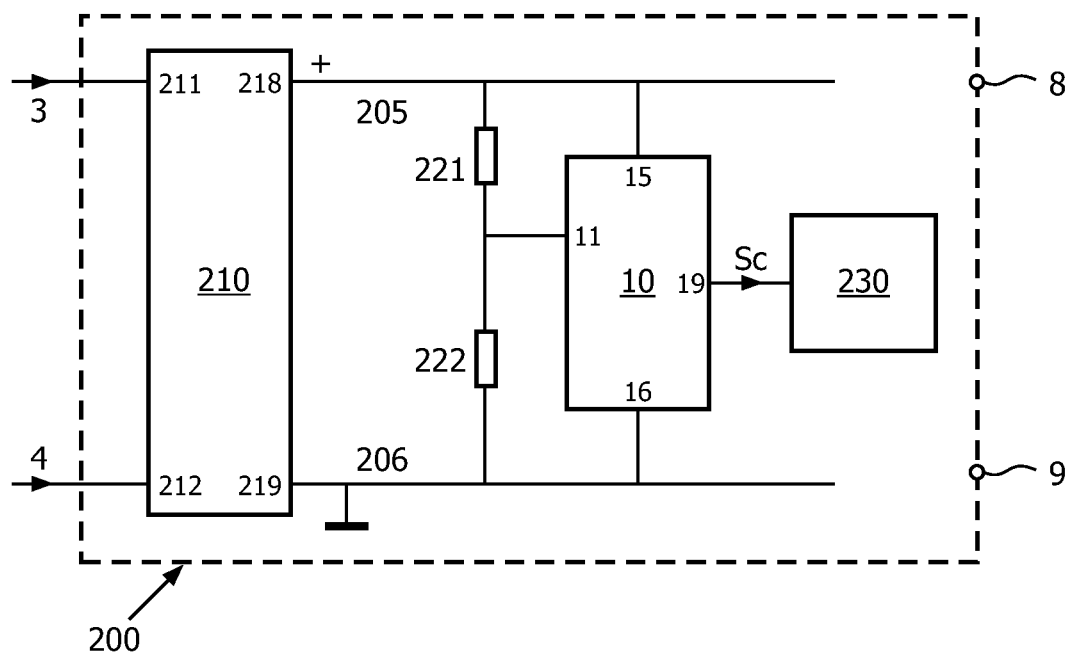
FIG. 4 is a block diagram illustrating an electronic driver according to the present invention.

FIG. 4 is a block diagram, comparable to FIG. 1, illustrating an electronic driver 200 according to the present invention, showing that the driver 200 receives the supply voltage Vs supplied by the voltage supply 30 of the programming device 100. The driver 200 comprises a rectifier 210, for instance a diode bridge, having input terminals 211, 212 connected to the driver input terminals 3, 4 to receive the AC supply voltage Vs and having output terminals 218, 219 connected to supply lines 205, 206 in the driver 200. The controller 10 has supply terminals 15, 16 connected to these supply lines 205, 206 receiving the rectified supply voltage, possibly after a smoothing filter (not shown) for removing frequency components.

It is assumed that the controller 10 has an analogue data input 11, which is typical for most common controllers. A measuring signal representing the rectified supply voltage is supplied to this analogue data input 11. This measuring signal is provided by a resistive voltage divider constituted by a series arrangement of two resistors 221, 222 connected between the supply lines 205, 206. The controller 10 is designed, by suitable software programming, to sample the signal at its input 11 at a suitably high sampling frequency, and to process this information to derive the data carried by the supply voltage, for instance by first deriving the time intervals between zero-crossings. In other words, the controller 10 is designed to demodulate the frequency-modulated supply voltage. Further, the controller 10 is designed to process the data thus received to adapt its settings and/or configuration, as should be clear to a person skilled in the art.

As an alternative, for instance in case the controller does not have any analogue data input, it is possible that the driver 200 comprises an additional data processing unit for receiving the rectified mains at an analogue input, deriving the data bits and providing the data bits to a digital input of the controller. But this requires an additional hardware component and is thus more expensive, while the preferred embodiment discussed above has the advantage that it can simply be implemented in software of the controller.

In one possible embodiment of the present invention, the programming of the controller 10 is open-ended, i.e. without feedback such as an acknowledgement. In a preferred embodiment, the controller 10 is capable of communicating back to the programming device 100, also using the supply lines. The communication may involve a simple acknowledgement, but may also involve a status report or a list of current settings. In any case, the electronic driver 200 should have a communication facility.

It is of course possible that the electronic driver 200 is provided with a device for superimposing some high frequency communication signal on to the supply voltage Vs, which signal could be received and processed by the programming device 100. However, this would be complicated and costly. To avoid this, the present invention proposes a solution that has the charm of being capable of being implemented in the software of the controller 10. In this implementation, the output 8, 9 of the electronic driver 200 is connected to a suitable load, for instance a lamp 2, such that the electronic driver 200 provides an output current and consequently draws an input current from the programming device, while further the controller 10 is designed to modulate this input current. For being able to detect this modulation of the driver's input current, the programming device 100 may be provided with a current sensor 40 sensing the output current provided at output 108, 109 of the programming device, and providing a measuring signal to a current sense input 24 of the program control device 20. It should be clear for a person skilled in the art that the program control device 20 can be designed (software) to process the measuring signal from the current sensor 40 to derive data communicated by the controller 10.

As far as the current modulation is concerned, it is noted that the controller 10 has an output 19 providing a control signal Sc that determines the momentary current magnitude to be supplied to the load 2. Typically, the electronic driver 200 comprises a power factor corrector 230 receiving this control signal, and taking care of all further current control. Since such power factor correctors are known per se, a further explanation is not needed here. For the following discussion, it is assumed that the control signal Sc is normally a signal having a constant value indicating a constant average current level.

The current modulation is preferably an amplitude modulation. Amplitude modulation can be executed in many ways, as should be known to a person skilled in the art, and in principle all modulation schemes can be applied when implementing the present invention. Nevertheless, the present invention also proposes a very simple modulation scheme, which will be explained with reference to FIG. 5. In this scheme, the modulation involves suppressing the current at a sufficiently high suppression frequency, for instance 500 Hz. This may also be considered as multiplication with a 500 Hz square wave. Each bit of information corresponds with one half-period of the supply voltage, i.e. the period between two successive zero-crossings. Per bit, the high-frequency suppression signal is either present or not, which corresponds to two different values for one data bit that are easily recognizable.

Figure 5:
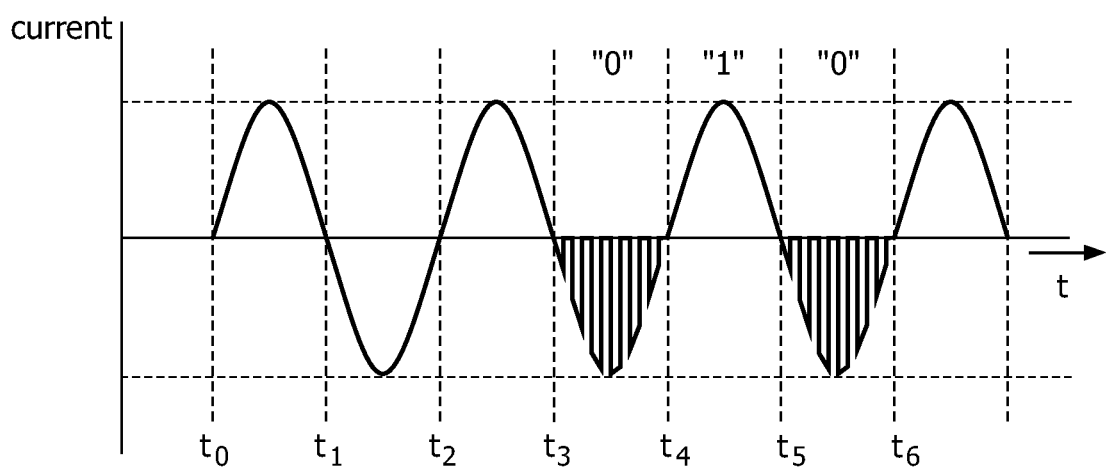
FIG. 5 is a graph illustrating the current drawn from the voltage source as a function of time.

FIG. 5 is a graph illustrating the current drawn from the voltage source 30 as a function of time, for an illustrative example in which it is assumed that the programming device 100 is not sending data to the electronic driver 200, so the current has a nominal frequency of 50 Hz. Zero-crossings of the current are indicated at t0, t1, t2, t3, etc. Time intervals between successive zero-crossings will be indicated as time frames. In the time frames between t0 and t3 the controller 10 is not sending any data to the programming device 100, so the current wave form is undisturbed. In the time frame between t3 and t4, the controller 10 is sending one bit of information ("0") by generating current pulses: this bit is interpreted as a start bit, starting a sequence of a predetermined number of bits. In the time frame between t4 and t5, the controller 10 is sending one data bit ("1") by not generating current pulses, while in the time frame between t5 and t6 the controller 10 is sending one data bit ("0") by generating current pulses.

Summarizing, the present invention provides a programming device 100 for programming a controller 10 in an electronic driver 200 comprises a controllable voltage supply 30 for generating an AC supply voltage, off grid, suitable for supplying the electronic driver 200 and a programming controller 20 for controlling the voltage supply 30. The programming device 100 is designed to modulate the supply frequency in order to both feed the electronic driver 200 and send programming data to the electronic driver 200.

While the invention has been illustrated and described in detail in the drawings and foregoing description, it should be clear to a person skilled in the art that such illustration and description are to be considered illustrative or exemplary and not restrictive. The invention is not limited to the disclosed embodiments; rather, several variations and modifications are possible within the protective scope of the invention as defined in the appending claims.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, digital signal processor, etc.

The invention claimed is:

1. Method for two-way communication, the method comprising:
    transmitting data from an AC voltage source over an AC voltage supply line to a consumer device, the method comprising the step of generating AC voltage at a predetermined base frequency and using frequency modulation for modulating the base frequency;
    transmitting, simultaneously, data from the consumer device to the AC voltage source by drawing a current from the voltage source and modulating the amplitude of the current drawn from the voltage source, wherein the voltage source comprises a programming controller and a current sensor for sensing the current drawn from the voltage supply, the current sensor having an output coupled to a sense input of the programming controller, wherein the programming controller is designed to decode amplitude modulated information from the sensor output signal;
    the consumer device being a driver for a light source.

2. Method according to claim 1, wherein at each zero-crossing the value of the base frequency is selected from a set of at least two possible frequency values in order to transmit at least one bit of information during the time interval till the next zero-crossing.

3. Method according to claim 1, wherein a bit of information corresponds with a time interval between two zero-crossings, wherein the base frequency is kept constant between said two zero-crossings and wherein the value of the base frequency is selected at the beginning of said time interval.

4. Method according to claim 3, wherein said two zero-crossings are two successive zero-crossings.

5. Method according to claim 3, wherein the base frequency is selected from a set of at least two possible frequency values indicating two possible values of a data bit, the method preferably having one or more of the following features a)-b):
   a) the set of possible frequency values for the base frequency include at least one frequency value indicating that no information is being sent;
   b) the ratio between two possible frequency values is always higher than 1.1, preferably higher than 1.5, more preferably higher than 2.

\* \* \* \* \*